United States Patent

[11] 3,630,623

[72] Inventor Gunter Schirmer
 Leinfelden, Germany
[21] Appl. No. 47,034
[22] Filed June 17, 1970
[45] Patented Dec. 28, 1971
[73] Assignee Robert Bosch GmbH
 Stuttgart, Germany
[32] Priority June 18, 1969
[33] Germany
[31] P 19 30 737.0

[54] DEVICE FOR MEASURING THE ANGULAR DEVIATION OF VEHICLE WHEELS
17 Claims, 11 Drawing Figs.

[52] U.S. Cl. .................................................. 356/155
[51] Int. Cl. ............................................... G01b 11/26
[50] Field of Search ........................................... 356/154,
 155, 152, 153; 250/202

[56] References Cited
UNITED STATES PATENTS 3,439,987 4/1969 Bacher et al. .................. 356/155
3,470,377 9/1969 Febre et al. .................... 250/202 X
3,197,643 7/1965 Morris ............................ 356/152

Primary Examiner—Ronald L. Wibert
Assistant Examiner—Conrad Clark
Attorney—Michael S. Striker ABSTRACT: A projector, pivotal about two orthogonal axes and driven by a servomotor for each axis, casts upon a reflector mounted on the wheel a pattern, consisting of three bright quadrants and one dark quadrant, which reflector returns the image to a screen having therein two photodiodes of which the outputs control respective ones of the servomotors. The projector is pivoted about one axis until one boundary line of the dark quadrant bisects one of the photodiodes, and then about the other axis until the other boundary line of the dark quadrant bisects the other photodiode, whereupon in each case the corresponding servomotor is stopped and the value of camber, caster, or camber and pivot inclination is given directly by an electrical circuit having a variable resistor of which the value is changed by the pivoting of the projector. There is one projector on each side of the vehicle.

INVENTOR
Günter SCHIRMER

By Michael S. Striker his ATTORNEY

INVENTOR
Günter SCHIRMER
BY
his ATTORNEY

INVENTOR
Günter SCHIRMER
BY Michael S. Striker
his ATTORNEY

INVENTOR
Günter SCHIRMER
BY
Michael S. Striker
his ATTORNEY

DEVICE FOR MEASURING THE ANGULAR DEVIATION OF VEHICLE WHEELS

BACKGROUND OF THE INVENTION

The invention relates to a device for measuring the angular deviation of wheels on vehicles.

Prior art devices of this sort comprise two reflectors mounted at either end of the wheel axle and at right angles thereto. A separate projector casts the image of a pattern onto each reflector, which returns the image to a stationary screen located near to the projector.

The pattern projected incorporates a scale, and the screen has a reticle. The position of the projected scale with respect to the reticle enables the angular deviation of the wheel to be read off.

The reading obtained is frequently inexact because the projected scale lines have a finite thickness. Moreover, this scheme cannot be adapted to electrical operation and read out, although it is exactly these two features that are essential in the continuing automation of workshops and testing stations.

SUMMARY OF THE INVENTION

An object of the invention is to provide a device for measuring the angular deviation from a plane of wheels for vehicles, which device ensures a very precise determination of the angles and which operates electrically.

The device of the invention consists broadly of projector means for casting an image of a pattern towards at least one wheel means, reflector means, mounted on the wheel means to assume the angular deviation thereof, and in the path of the projected image to reflect the image, screen means mounted in the path of the reflected image, whereby an optical path is defined between the projector means and the screen means, at least one control indicium arranged on the screen means in such a position that the image of the reflected measuring indicia is located on the screen means in a predetermined position relative to the control indicium when the wheel means are undeviated from a predetermined plane, and means for angularly changing the direction of at least part of the optical path so as to enable changing of the position of the image of the reflected measuring indicia cast on the screen means until the image is in the predetermined position relative to the control indicium on the screen, whereby the extent of angular change of part of the optical path is an indication of the angular deviation of the position of the wheel means from a predetermined plane relative to the body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
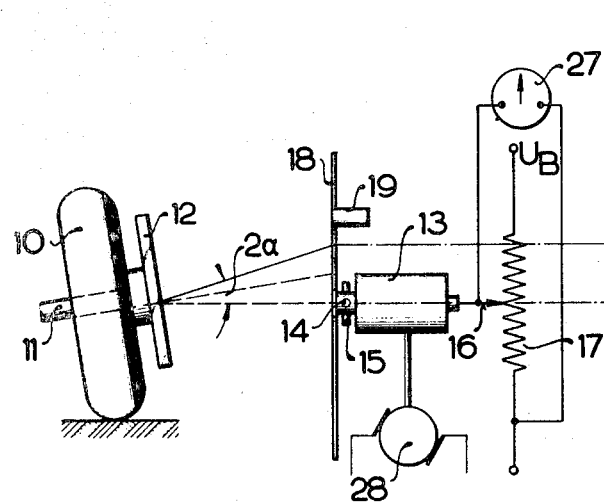
FIGS. 1a and 1b are respectively a side view of the measuring device and a plan view of the screen and pattern, with the projector not pivoted.
Figure 1B:
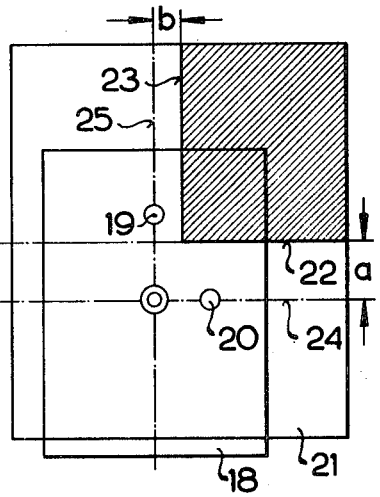
Figure 2A:
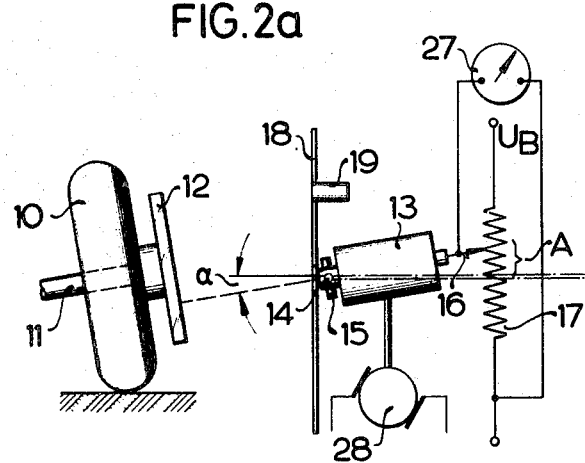
FIGS. 2a and 2b correspond respectively to FIGS. 1a and 1b, with the projector pivoted about a horizontal axis.
Figure 2B:
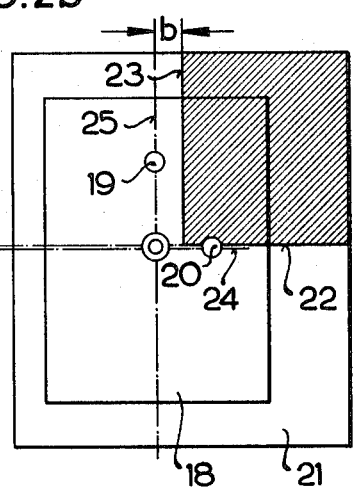
Figure 6:
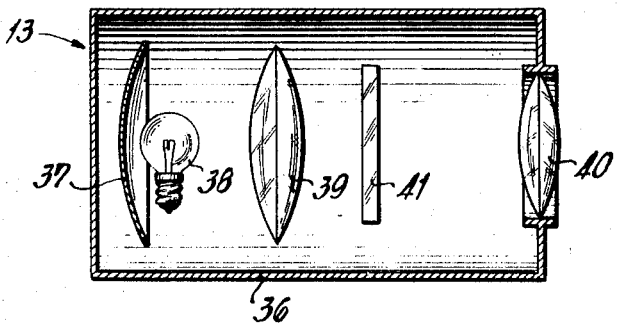
FIG. 6 is a simplified representation of a projector.

With reference to FIG 1a, a wheel 10 of a vehicle carries a reflector 12, which is at right angles to the wheel axle 11. Positioned opposite the reflector is a projector 13 that can pivot about a horizontal axle 14 and a vertical axle 15. Alternately, the axles themselves turn. The projector is fixed to the movable tap 16 of a resistor 17 connected to a source of voltage $U_B$. A projection screen 18 is mounted in front of the projector 13, and two control indicia, in this case photodiodes 19 and 20, are arranged in the plane of the screen. FIG. 1b shows the screen in plan view, with projected onto it the image 21 of a pattern, or measuring indicia, having four quadrants of which the first is dark and the remaining three are bright. FIG. 6 shows schematically a suitable projector for casting the desired pattern. In the projector housing 36 are mounted a reflector 37, light source 38, condenser lens 39, an objective 40, and between the two lenses 39 and 40 a glass plate 41. The latter has on it the pattern of which an image is to be projected.

An exactly similar arrangement of parts is located on the other side of the vehicle. The projector on each side of the vehicle is, in its normal position, so adjusted with respect to the other that the optical axes of the two projectors coincide.

The projector 13, which in FIG. 1a is shown in its normal position, projects the image pattern 21 onto the reflector 12, which reflects the image back to the screen 18. The reflected image has been turned through an angle $2\alpha$, and is imaged on the screen 18, as shown in FIG. 1b. The horizontal light-dark boundary 22 of the first quadrant extends at a distance a from an imaginary horizontal bisector 24 of the screen 18. The vertical light-dark boundary 23 extends at a distance b from an imaginary vertical bisector 25 of the screen 18. The photodiodes are so positioned that the vertical bisector 25 bisects the opening to the photodiode 19 and the horizontal bisector 24 bisects the opening to the photodiode 20.

In the arrangement shown in FIGS. 1a and 1b, the distance a corresponds to the angle $2\alpha$ and is therefore proportional to the camber $\alpha$ of the wheel axle 11. The distance b corresponds to the caster.

The camber and caster angles are obtained by turning the projector 13 about the respective axles 14 and 15. When measuring camber, the projector is pivoted about the axle 14 until the horizontal light-dark boundary 22 coincides with the horizontal bisector 24. This means that the angle $2\alpha$, which is formed in the optical path between the two imaginary central rays emanating respectively from the projector 13 and from the reflector 12, is reduced to zero by pivoting the projector from its horizontal position. The optical axis of the projector is thereby made parallel to the wheel axle 11, and the angle defined between the projector's optical axis of the horizontal is equal to the camber angle. The angle through which the projector is turned is equal to the camber angle and corresponds to the distance A through which the tap 16 is moved along the resistor 17. This distance A, in turn, corresponds to the value of the resistance along this distance and, therefore, to the voltage drop over this distance. Either this resistance or voltage drop can be measured as a value of the angular position of the wheel axle 11.

Thus, the voltage drop operates a meter 27, which can be calibrated in degrees. Alternatively, the resistance or voltage drop can be conducted to a data-processing unit or a suitable graphic recorder.

When measuring camber and caster, the measurements, in effect, are being made of the angular deviation of the front wheels from a predetermined plane that is vertical and extends parallel to the longitudinal axis of the vehicle. If the angular deviation of the wheel from this plane were zero, the two light-dark boundaries of the pattern cast onto the screen would coincide with the respective horizontal and vertical bisectors 24 and 25. When conducting measurements, the image on the screen is returned to the predetermined position in which the light-dark boundary corresponding to the particular measurement made bisects its photodiode.

There is provided a suitable mechanical arrangement for so fixing the projector 13 to the resistor tap 16 that the latter is caused to move the correct distance over the resistor 17 irrespective of whether the projector pivots about its horizontal or vertical axis.

Figure 7:
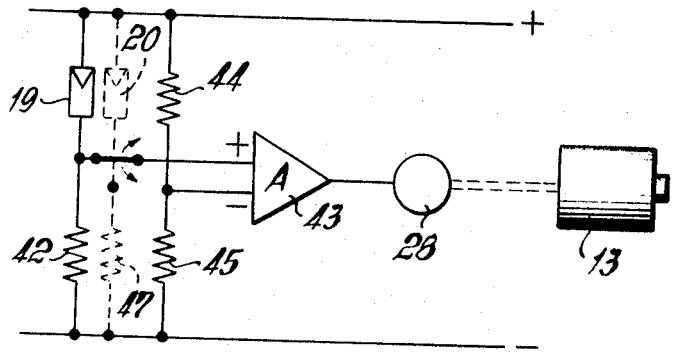
FIG. 7 is a schematic diagram showing a circuit for controlling the operation of a servomotor.

The image pattern can also be positioned automatically on the screen 18 by a servomotor 28 turning the projector 13. In this embodiment, shown in FIG. 7, the photodiode 19 and a resistor 42 comprise a voltage divider, of which the connection between the resistor and the photodiode is connected to a first input of a conventional operational amplifier 43. A second input of this amplifier is connected to a stable reference voltage on a voltage divider formed by the resistors 44 and 45. The output of the operational amplifier is connected to the servomotor 28, which pivots the projector 13. The values of the voltage dividers 19, 42 and 44, 45 are so chosen that, when the light-dark boundary 22 bisects the photodiode 19, the voltages are equal at the connections between the components 19, 42 and 44, 45. When this is the case, the servomotor 28 is stopped. If these two voltages are unequal, the servomotor is driven in one or the other direction until they are equal. Either one or two servomotors can be used. If two servomotors are used, one for each of the photodiodes 19 and 20, then each motor 28 has its own operational amplifier 43 and two voltage dividers 19, 42 (or 20, 47) and 44, 45. If a single servomotor is employed, there will be a third voltage divider comprised of the photodiode 20 and resistor 47 (shown in broken line) and a switch 48 provided for switching the first input of the operational amplifier between the voltage dividers 19, 42 and 20, 47. The switching can be done automatically by known means, or done by hand. When a single servomotor is used the projector advantageously has only one pivot axis, which extends diagonally along the plane of the screen 18, so that turning the projector about this single axis enables either of the lightdark boundaries 22 and 23 to be aligned with the corresponding imaginary bisecting line 24 or 25. This construction offers a substantial reduction in cost.

Alternately, there can be provided for the projector two orthogonal pivot axes and a single servomotor used to pivot the projector successively about each axis.

The measured value of the voltage drop corresponding to the camber or alignment angle can also be obtained by operating the servomotor 28 to move the image pattern 21 continuously over the screen 18. At the moment that the light-dark boundary 22 or 23 bisects the respective photodiode 20 or 19, the output of the photodiode falls to one-half of its normal value. This fact can be used as a "signal" to cause the value of the voltage drop along the distance A to be measured automatically at this moment, and from which value, as previously explained, the camber or caster angle is obtained.

In accordance with the invention, when employing a single projector pivot axis, inclined to the plane of the screen 18, the image pattern can be swept continuously over the screen 18. In this case, the desired value is measured automatically when the output of the corresponding photodiode falls to one-half of its normal value, as explained above. The camber and alignment angles can be measured separately, one after the other, as each photodiode in turn is bisected by corresponding light-dark boundary 22 or 23.

Figure 8:
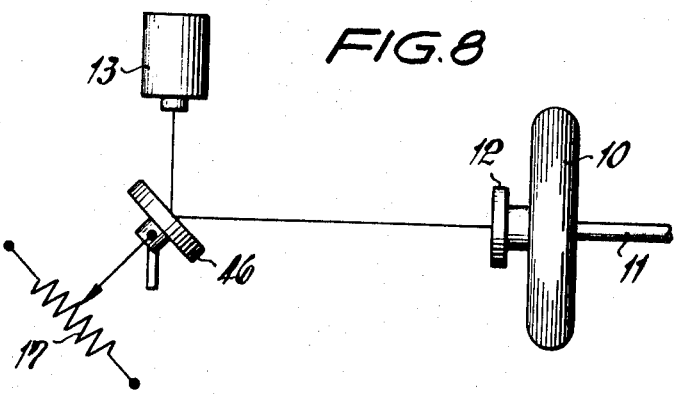
FIGS. 8 and 9 are simplified side views of two further forms of the invention.

The optical path between the projector 13 and the screen 18 can also be shifted in other ways than by pivoting the projector. As shown in FIg. 8. a reflector 46 is positioned to reflect the image pattern from the projector to the reflector 12 on the wheel. The reflector is mounted free to pivot about two orthogonal axes and is rigidly connected to the movable tap of a resistor 17. The servo arrangement for moving the reflector 46 is fundamentally the same as the arrangement for pivoting the projector in the previous embodiments. This embodiment has the advantage, however, that the reflector 46 has much less inertial than a projector and the measurements consequently are more quickly made. The reflector 12, in the embodiment sown in FIG. 8, reflects the image pattern back to the screen, not shown. The measurements are accomplished in the same way as in the previously forms of the invention.

Figure 9:
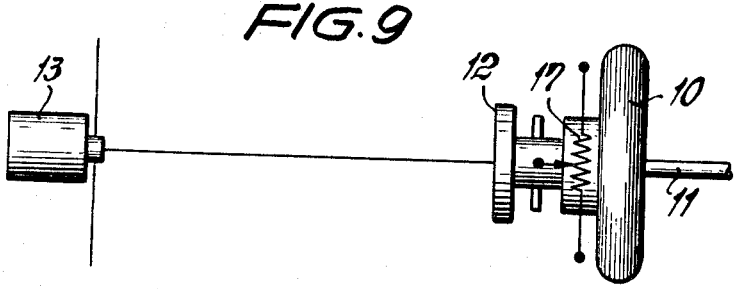

In a still further embodiment, shown in FIG. 9, the projector 13 remains stationary, and the reflector 12 is mounted on the wheel 10 free to pivot about two mutually orthogonal axes, thereby changing the position of the movable tap on resistor 17. The position of the pivotal reflector 12 can be controlled by a servomotor in exactly the same way that the position of the projector 13 is controlled in the embodiment shown in FIG. 1a.

Figure 3:
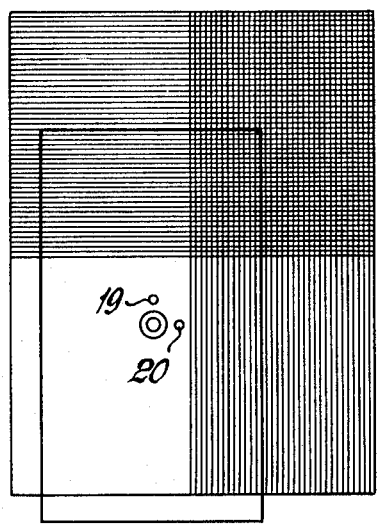
FIG. 3 is a plan view of the screen and of the modified pattern projected upon it.

The measuring range of the projector is limited by the length of the l light-dark boundary 22 or 23. If the camber or caster is unusually great, it can happen that the horizontal light-dark boundary 22 falls across the photodiode 19. To avoid this, the length of the light-dark boundaries extend the entire height and width of the image pattern, as shown in FIG. 3. Quadrants I and II of the pattern are made red, for example, and quadrants I and IV are made bluish green. This is easily done by using red and bluish green colored light filters, which can be mounted in a known manner in the path of the light beam inside of the projector 13 shown in FIG. 6. Since both of the color filters cover the first quadrant of the pattern, this quadrant appears black. In front of each of the photodiodes there is placed a colored filter that prevents transmission of light from the corresponding quadrant, which is quadrant II for photodiode 19 and IV for 20. In the particular example chosen, a blue-green filter covers photodiode 19 and a red filter covers photodiode 20.

Figure 4:
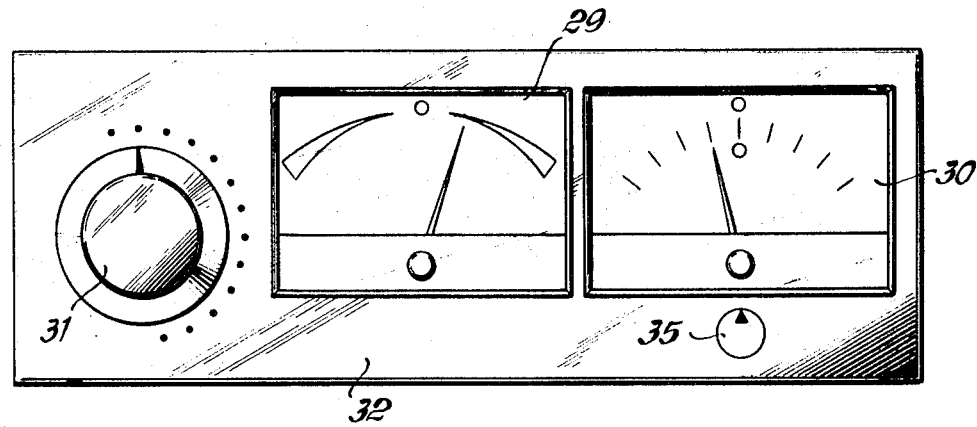
FIG. 4 is a front view of an indicating unit for the invention.

The measurements are evaluated, as shown in FIG. 4, with the aid of an indicating unit 32 moving two meters 29 and 30, which a flexible cable connects to the right and left projectors, on either side of the vehicle. The unit 32 further comprises a function switch 31, which enables each of the measurements — camber, caster, and camber and pivot inclination — to be made. The person who is making the measurements takes the unit 32 with him into the vehicle, from where the measurements are made. The camber and caster angles are shown on one of the meters 29 and 30 and/or connected by cable to a computer.

Figure 5:
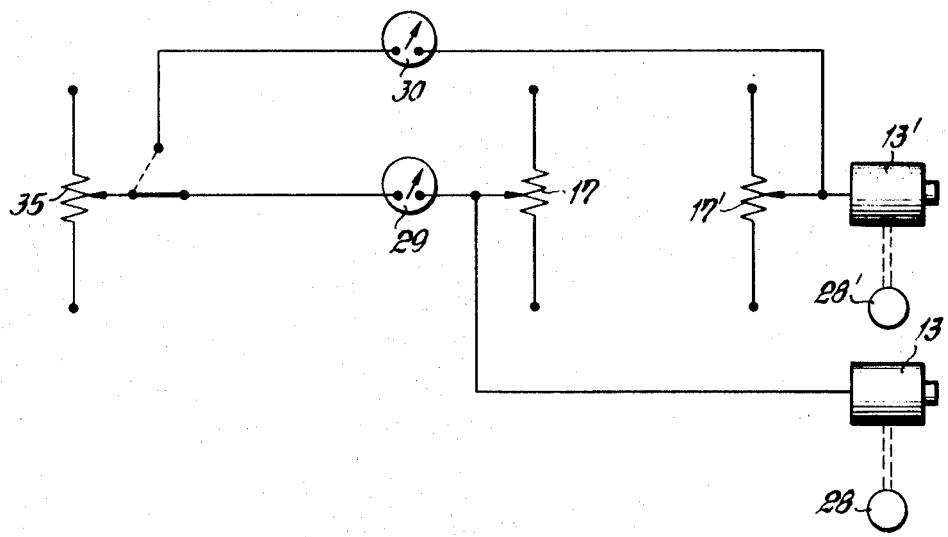
FIG. 5 is a schematic diagram of the circuit housed in the indicating unit.

The circuit contained in the unit 32 is shown in FIG. 5. When caster is being measured, the front wheels are turned until they are symmetrical to the longitudinal axis of the vehicle. A given angular position (caster) of the right front wheels results in a certain position of the variable tap on resistor 17, caused by the pivoting of the projector 13. In the other embodiments, the position of the variable tap would depend on the position of reflector 12 (FIG. 9) or of the reflector 46 (FIG. 8). Since the resistor 17, as well as the resistors 17' and 38, are connected across a source of voltage (not shown), there exists at the variable tap a voltage of which the value is uniquely dependent on the position on the position of the tap. The variable tap of resistor 35 is moved until the meter 29 is set to zero, indicating that the voltages at the two taps in question are equal. In this way, the caster of the right wheel is "stored" in the position of the tap of resistor 35. The switch 31 is new turned to its position shown in broken line. The angular position (caster) of the left wheel corresponds to the position of the tap on resistor 17'. Consequently, the difference in voltage between the taps of resistors 17' and 35 corresponds to the total caster. This voltage difference drives a current through the meter 30, which can be calibrated in angular degrees of camber.

When measuring camber and pivot inclination, a front wheel, such as the right, is turned left through a known angle. The resulting camber indicated by the position of the tap of resistor 17, is electrically stored by the position of the tap of resistor 35, in the same manner as described in connection with the measurement of the total caster. The wheel is now turned through an equal angle in the opposite direction, and the projector 13 pivoted until the light-dark boundary 22 bisects the photodiode 20. With the switch 31 still connected to resistor 35, the new position of the tap on resistor 17 causes the second value of the camber to be subtracted according to sign from the first value, the difference corresponding to the camber and pivot inclination, which can be read from meter 29.

It will be understood that each of the elements described above, or two or more together, may also find a useful application in other types of inventions differing from the types described above.

While the invention has been illustrated and described as embodied in a device for measuring the angular inclination of vehicle wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims.

I claim:

1. An arrangement for measuring angular deviation of at least one wheel means from a predetermined plane relative to the body of vehicle, comprising, in combination, projector means adapted to project an image of measuring indicia toward said wheel means; reflector means, mounted on said wheel means to assume the angular deviation thereof, and mounted in the path of the projected image to reflect said image; screen means mounted in the path of the reflected image, whereby an optical path is defined between said projector means and said screen means; at least one control indicium arranged on said screen means in such a position that said image of the reflected measuring indicia is located on said screen means in a predetermined position relative to said control indicium when said wheel means are undeviated from said predetermined plane; means for angularly changing the direction of at least part of said optical path so as to enable changing of the position of said image on said screen means until said image is in said predetermined position relative to said control indicium on said screen means, whereby the extent of angular change of said part of the optical path is an indication of the angular deviation of the position of said wheel means from said predetermined plane; and electrical means for measuring the angular change of said part of said optical path and providing an indication of the magnitude of said angular change.

2. An arrangement as defined in claim 1, including at least one axle defining an axis about which said projector means is free to pivot, whereby the direction is changed of part of said optical path.

3. An arrangement as defined in claim 1, including further reflector means in said optical path and at least one axle defining an axis about which said further reflector means is free to pivot, whereby the direction is changed of part of said optical path.

4. An arrangement as defined in claim 1 including at least one axle defining an axis about which said reflector means is free to pivot, whereby the direction is changed of part of said optical path.

5. An arrangement as defined in claim 1, wherein said means for angularly changing the direction of said part of the optical path includes further electrical means.

6. An arrangement as defined in claim 5, wherein said projector means include means for producing an image divided into regular quadrants of differing degrees of brightness so as to produce at least one light-dark boundary.

7. An arrangement as defined in claim 6, wherein one of said quadrants is dark and the rest are at least relatively bright, and said quadrants are arranged to produce two mutually orthogonal light-dark boundaries.

8. An arrangement as defined in claim 7 wherein said projector means include transmission color filter means for coloring a first two contiguous quadrants one color and a second two contiguous quadrants a complementary color, said first and second two contiguous quadrants having one quadrant in common.

9. An arrangement of defined in claim 7, wherein said screen means define a plane, and said control indicium is phototransducer means, associated with said screen means and in the plane thereof, for being energized by light in said image cast on said screen means by said reflector means, and for controlling the operation of said further electrical means in dependence on the amount of light received by said phototransducer means.

10. An arrangement as defined in claim 9 for measuring the camber and caster of said wheel means, wherein said phototransducer means comprise first and second phototransducers, each associated with a different one of said light-dark boundaries and a different one of the two measurements, for stopping operation of said further electrical means whenever the respective one of said light-dark boundaries falls across the corresponding phototransducer, and wherein in said predetermined position of said image at least one of said light-dark boundaries falls across the respective one of said first and second phototransducers.

11. An arrangement as defined in claim 1, for measuring the camber and caster of said wheel means, wherein said screen means define a plane, and said projector means include means for producing an image divided into regular quadrants of which one is dark and the rest are at least relatively bright so as to produce two mutually orthogonal light-dark boundaries, and including first and second phototransducers associated with, and in the plane of, said screen means for being energized by light in said image cast on said screen means by said reflector means, each of said first and second phototransducers being associated with a different one of said light-dark boundaries and with a different one of the two measurements, and wherein said means for angularly changing the direction of part of said optical path does so continuously, whereby said image is continuously moved over said screen means and each of said light-dark boundaries is caused to pass over its respective phototransducer, and wherein said predetermined position of said image said light-dark boundaries fall over respective ones of said first and second phototransducers.

12. An arrangement as defined in claim 10, wherein the pivotal movement of said projector means as horizontal and vertical components, and said further electrical means comprises at least one servomotor operatively connected to said projector means to pivot the latter, and wherein one of said light-dark boundaries and said first phototransducer cooperate to measure camber and the other of said light-dark boundaries and said second phototransducer cooperate to measure caster.

13. An arrangement as defined in claim 12 wherein said projector means include transmission color filter means for coloring a first two contiguous quadrants one color and a second two contiguous quadrants a complementary color, said first and second two contiguous quadrants having one quadrant in common, and transmission color filter means in front of each of said first and second phototransducers, whereby said first phototransducer receives relatively little light from the darker side of said one light-dark boundary and said second phototransducer receives relatively little light from the darker side of said other light-dark boundary.

14. An arrangement as defined in claim 1, including two said projector means, one on each side of said vehicle, for measuring angular deviation of a respective wheel means and including electrical means for measuring the angular change in said part of the optical path.

15. An arrangement as defined in claim 14, wherein said electrical means include variable resistance means connected to have their resistance changed in response to the angular change in the direction of said part of the optical path.

16. An arrangement as defined in claim 15, for measuring camber, caster, and chamber and pivot inclination, and wherein said electrical means further include electrical adding means for summing the caster of each of said two wheel means, and electrical indicating means for indicating the sum thus electrically added.

17. An arrangement as defined in claim 16, where in said electrical adding means include electrical means for subtracting according to sign the camber of said two wheels turned through a given angle in one direction from the chamber of said two wheels turned through an equal angle in the opposite direction so as to obtain the camber and pivot inclination, and said indicating means indicate the difference.

* * * * *